(12) United States Patent
Cao

(10) Patent No.: US 11,138,743 B2
(45) Date of Patent: Oct. 5, 2021

(54) METHOD AND APPARATUS FOR A SYNCHRONOUS MOTION OF A HUMAN BODY MODEL

(71) Applicant: BAIDU ONLINE NETWORK TECHNOLOGY (BEIJING) CO., LTD., Beijing (CN)

(72) Inventor: Yifan Cao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 175 days.

(21) Appl. No.: 16/511,189

(22) Filed: Jul. 15, 2019

(65) Prior Publication Data
US 2019/0340773 A1 Nov. 7, 2019

(30) Foreign Application Priority Data
Aug. 30, 2018 (CN) .......................... 201811002871.1

(51) Int. Cl.
*G06T 17/00* (2006.01)
*G06T 7/246* (2017.01)
(Continued)

(52) U.S. Cl.
CPC .............. *G06T 7/248* (2017.01); *G06F 3/011* (2013.01); *G06F 3/017* (2013.01); *G06T 7/74* (2017.01);
(Continued)

(58) Field of Classification Search
CPC .. G06F 3/011; G06F 3/01; G06T 2207/10028; G06T 7/20–292; G06T 17/00–30
See application file for complete search history.

(56) References Cited

U.S. PATENT DOCUMENTS

2018/0365848 A1* 12/2018 Lee ....................... G06F 3/0482

FOREIGN PATENT DOCUMENTS

| CN | 101337128 A | 1/2009 |
| CN | 105975923 A | 9/2016 |

(Continued)

OTHER PUBLICATIONS

Notice of Allowance issued in Chinese Application No. 201811002871. 1; dated Sep. 28, 2020; 4 pages.
(Continued)

*Primary Examiner* — Brian Werner
(74) *Attorney, Agent, or Firm* — Dilworth IP, LLC

(57) ABSTRACT

A method and an apparatus for a synchronous motion of a human body model, where the method includes: capturing a real-time image of a real human body; determining size change information according to the real-time image, where the size change information is used to represent a size change of at least part of the real human body in the real-time image; determining motion information according to the size change information, where the motion information is used to represent a position change of the human body model along a depth direction in a three-dimensional scene, and the human body model is used to simulate the real human body; and changing a position of the human body model in the three-dimensional scene according to the motion information. The disclosure achieves a forward or backward synchronous motion between a human body model and a real human body.

18 Claims, 8 Drawing Sheets

(51) Int. Cl.
*G06T 7/73* (2017.01)
*G06F 3/01* (2006.01)
(52) U.S. Cl.
CPC ............... *G06T 2207/10028* (2013.01); *G06T 2207/20224* (2013.01)

(56) References Cited

FOREIGN PATENT DOCUMENTS

| CN | 106055082 A | 10/2016 |
| CN | 106091929 A | 11/2016 |

OTHER PUBLICATIONS

CN Office Action; Application No. 201811002871.1; dated Dec. 5, 2019; 9 pages.

\* cited by examiner

METHOD AND APPARATUS FOR A SYNCHRONOUS MOTION OF A HUMAN BODY MODEL

CROSS-REFERENCE TO RELATED APPLICATION

This application claims priority to Chinese Patent Application No. 201811002871.1, filed on Aug. 30, 2018, which is hereby incorporated by reference in its entirety.

FIELD

The disclosure relates to the field of human-computer interaction, and in particular to a method and apparatus for a synchronous motion of a human body model.

BACKGROUND

In some scenes where a terminal interacts with a human, it is required to utilize a synchronous motion of a human body model and a real human body to represent the real human body. Based on the synchronous motion, the human body model can be used to visually reflect a motion of the real human body.

In the related prior art, in order to realize the representation of the real human body by the human body model, an image capturing component is used to capture a real-time image of the real human body, and then a body detection technology is used to determine a position of a human body part in the real-time image, and further, according to a change of the position of the human body part, the human body model is controlled to do a two-dimension motion.

However, if the human body moves forward or backward relative to a lens of the image capturing component, the motion process of the human body model cannot effectively reflect the forward or backward motion.

SUMMARY

The present disclosure provides a method and apparatus for a synchronous motion of a human body model, in order to solve the problem that the motion process of the human body model cannot effectively reflect the forward or backward motion.

According to a first aspect of the present disclosure, providing a method for a synchronous motion of a human body model, where the method includes:

capturing a real-time image of a real human body;

determining size change information according to the real-time image, where the size change information is used to represent a size change of at least part of the real human body in the real-time image;

determining motion information according to the size change information, where the motion information is used to represent a position change of the human body model along a depth direction in a three-dimensional scene, and the human body model is used to simulate the real human body; and changing a position of the human body model in the three-dimensional scene according to the motion information.

Optionally, before the determining motion information according to the size change information, further including:

determining a difference, where the difference is used to represent a difference between a standard length-to-width ratio of the at least part of the real human body and a current length-to-width ratio of the at least part of the real human body in the real-time image; and determining whether the difference is less than a preset difference threshold.

Optionally, when the difference is less than the preset difference threshold, the determining motion information according to the size change information, including:

determining the motion information according to a length change amount and a width change amount of the at least part of the real human body.

Optionally, when the difference is greater than or equal to the preset difference threshold, the method further including:

selecting a target change amount, which is a bigger change amount between the length change amount and the width change amount of the at least part of the real human body; and the determining motion information according to the size change information, including:

determining the motion information according to the target change amount.

Optionally, before the selecting a target change amount, which is a bigger change amount between the length change amount and the width change amount of the at least part of the real human body, further including:

determining that a foot position of the real human body in the real-time image has changed in the depth direction.

Optionally, when the size change information is first size change information used to represent that the at least part of the real human body becomes bigger, the motion information is first motion information used to represent that the human body model moves toward a near field port of the three-dimensional scene; and when the size change information is second size change information used to represent that the at least part of the real human body becomes smaller, the motion information is second motion information used to represent that the human body model moves toward a far field port of the three-dimensional scene;

Optionally, after the capturing a real-time image of a real human body, further including:

acquiring first part information, where the first part information is used to represent a position change of a human body part of the real human body in the real-time image;

determining second part information of the human body model in the three-dimensional scene according to the first part information, where the second part information is used to represent a position change of a model part point corresponding to the human body part in the human body model; and changing the human body model according to the second part information.

Optionally, the at least part of the real human body is a torso part of the real human body.

Optionally, the human body part includes at least one of: a head, a neck, a left shoulder, a right shoulder, a left elbow, a right elbow, a left wrist, a right wrist, a left hip, a right hip, a left knee, a right knee, a left foot, and a right foot.

According to a second aspect of the present disclosure, providing an apparatus for a synchronous motion of a human body model, where the apparatus includes:

a capturing module, which is configured to capture a real-time image of a real human body;

a size change acquiring module, which is configured to determine size change information according to the real-time image, where the size change information is used to represent a size change of at least part of the real human body in the real-time image;

a motion information determining module, which is configured to determine motion information according to the size change information, where the motion information is used to represent a position change of the human body model along a depth direction in a three-dimensional scene, and the human body model is used to simulate the real human body;

a position changing module, which is configured to change a position of the human body model in the three-dimensional scene according to the motion information.

Optionally, the apparatus further includes:

a difference determining module, which is configured to determine a difference, where the difference is used to represent a difference between a standard length-to-width ratio of the at least part of the real human body and a current length-to-width ratio of the at least part of the real human body in the real-time image; and a less than threshold determining module, which is configured to determine whether the difference is less than a preset difference threshold.

Optionally, when the difference is less than the preset difference threshold, the size change acquiring module including:

a first motion information determining unit, which is configured to determine the motion information according to a length change amount and a width change amount of the at least part of the real human body.

Optionally, when the difference is greater than or equal to the preset difference threshold, further including:

a change amount determining module, which is configured to select a target change amount, which is a bigger change amount between the length change amount and the width change amount of the at least part of the real human body; and the size change acquiring module including:

a second motion information determining unit, which is configured to determine the motion information according to the target change amount.

Optionally, the apparatus further includes:

a foot motion determining module, which is configured to determine that a foot position of the real human body in the real-time image has changed in the depth direction.

Optionally, when the size change information is first size change information used to represent that the at least part of the real human body becomes bigger, the motion information is first motion information used to represent that the human body model moves toward a near field port of the three-dimensional scene; and when the size change information is second size change information used to represent that the at least part of the real human body becomes smaller, the motion information is second motion information used to represent that the human body model moves toward a far field port of the three-dimensional scene.

Optionally, the apparatus further includes:

a first part acquiring module, which is configured to acquire first part information, where the first part information is used to represent a position change of a human body part of the real human body in the real-time image;

a second part determining module, which is configured to determine second part information of the human body model in the three-dimensional scene according to the first part information, where the second part information is used to represent a position change of a model part point corresponding to the human body part in the human body model; and a human body model changing module, which is configured to change the human body model according to the second part information.

Optionally, the at least part of the real human body is a torso part of the real human body.

Optionally, the human body part includes at least one of: a head, a neck, a left shoulder, a right shoulder, a left elbow, a right elbow, a left wrist, a right wrist, a left hip, a right hip, a left knee, a right knee, a left foot, and a right foot.

According to a third aspect of the present disclosure, providing an electronic device, including a memory and a processor, where, the memory is configured to store an executable instruction of the processor; and the processor is configured to perform the methods for a synchronous motion of a human body model involved in the first aspect and optional aspects thereof by executing the executable instruction.

According to a fourth aspect, providing a storage medium, having a computer program stored thereon, where the program is executed by the processor so as to implement the methods for a synchronous motion of a human body model involved in the first aspect and optional aspects thereof.

The method and apparatus for a synchronous motion of a human body model provided by the present disclosure achieve the forward or backward synchronous motion between a human body model and a real human body by: acquiring a size change information, determining motion information according to the size change information, and changing a position of the human body model in the three-dimensional scene according to the motion information.

BRIEF DESCRIPTION OF DRAWINGS

In order to more clearly illustrate technical solutions in embodiments of the present disclosure or in the prior art, accompanying drawings required for describing the embodiments or the prior art will be briefly described below. Apparently, the accompanying drawings in the following description are some of the embodiments of the present disclosure, and other drawings can be obtained by those skilled in the art based on these accompanying drawings without any creative labor.

DETAILED DESCRIPTION

The technical solutions in embodiments of the present disclosure are clearly and completely described in the following with reference to the accompanying drawings in the embodiments of the present disclosure. Apparently, the described embodiments are only some of, instead of all of, the embodiments of the present disclosure. All other embodiments obtained by those skilled in the art based on the embodiments of the present disclosure without creative labor will fall within the scope of the present disclosure.

The terms "first", "second", "third", "fourth", etc. (if present) in the specification, claims and the above-mentioned figures of the present disclosure are used to distinguish similar objects and are not necessarily used to describe a specific order or sequence. It is to be understood that the data used as such may be interchanged where appropriate, so that the embodiments of the disclosure described herein can be implemented in a sequence other than those illustrated or described herein. In addition, the terms "include", "include" and any of their variations are intended to cover a non-exclusive inclusion, for example, a process, method, system, product, or device that includes a series of steps or units is not necessarily limited to those steps or units and may include other steps or units not explicitly listed or inherent to such process, method, product or device.

The technical solutions of the present disclosure will be described in detail below with specific embodiments. The following specific embodiments may be combined with each other, and the same or similar concepts or processes may not be repeatedly described in some embodiments.

Figure 1:
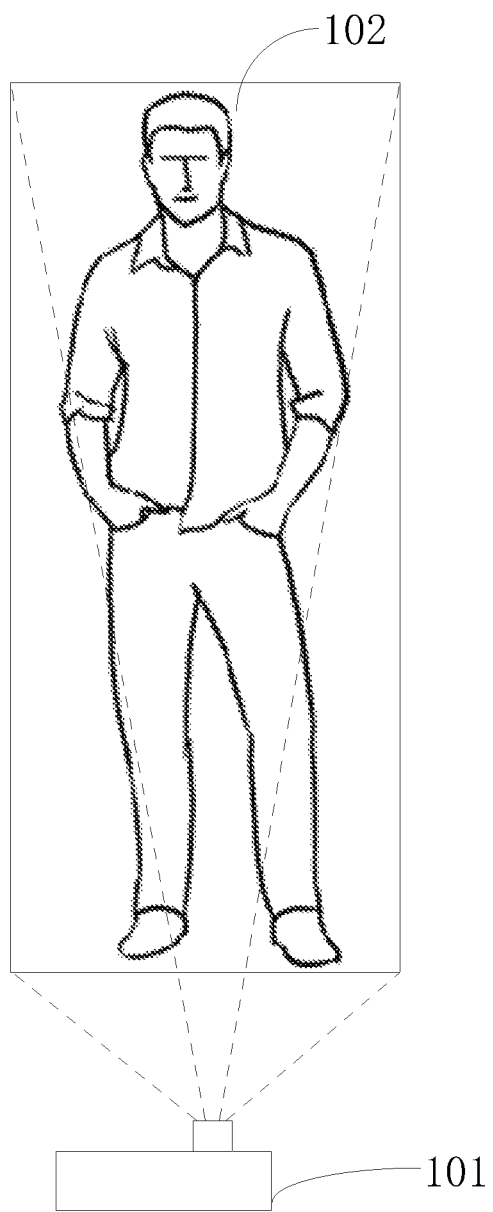
FIG. 1 is a schematic diagram of an application scenario according to an embodiment of the present disclosure.

FIG. 1 is a schematic diagram of an application scenario in an embodiment of the present disclosure.

Referring to FIG. 1, an application scenario involved in the embodiment of the present disclosure may be an application scenario, for example, where an image capturing module 101 is utilized to capture a real-time image of a real human body 102, and a synchronization of a human body model can be achieved based on the captured real-time image.

Where the image capturing component 101 can be understood as any component that can capture an image through optical principles, which may be an image capturing component 101 of any terminal or the terminal itself. The terminal mentioned above can be understood as a device having a memory and a processor, specifically, for example, a mobile phone, a tablet computer, a computer, a camera, a video camera, and the like.

The real-time image can be understood as any image containing a real human body, which is captured by the image capturing component 101 and can be updated in real time.

Figure 2:
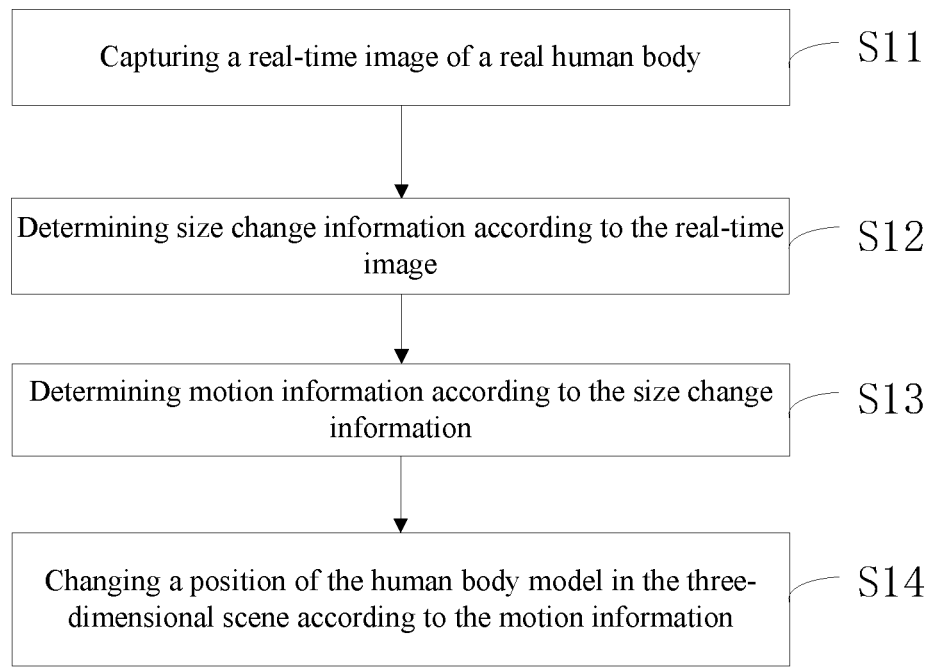
FIG. 2 is a schematic flow chart of a method for a synchronous motion of a human body model according to an embodiment of the present disclosure.

FIG. 2 is a schematic flow chart of a method for a synchronous motion of a human body model according to an embodiment of the present disclosure.

Referring to FIG. 2, the method for a synchronous motion of a human body includes:

S11: capturing a real-time image of a real human body.

S12: determining size change information according to the real-time image.

It can be understood that the size change information is used to represent a size change of at least part of the real human body in the real-time image. Because any one of a length change, an area change and an angle change can represent the size change in the real human body in the real-time image, parameters calculated using at least one of a length, an area and an angle, or parameters calculated based on at least one of the above do not deviate from the description range of the size change information.

Where, the size change can be understood as a change between a size of the real human body in the real-time image at the current moment and a size of the real human body in the real-time image at the previous one or more moments.

S13: determining motion information according to the size change information.

It can be understood that the motion information is used to represent a position change of the human body model along a depth direction in a three-dimensional scene. Where the depth direction can be understood as a direction in which the human body model move forward or backward. At the same time, the human body model is used to simulate the human body. Therefore, a relationship between the front and the back of the human body model and the human body model can be understood according to the relationship between the front and back of the real human body and the real human body.

The human body model can be understood as a model used to simulate the real human body, which may be a two-dimensional or three dimensional model in a three dimensional scene.

For the image capturing component, the closer the real human body is to a lens, the larger its size will be, and the farther the real human body is from the lens, the smaller its size will be. Therefore, the size change actually represents whether the real human body moves forward or backward and the distance of the forward or backward motion. Correspondingly, when the real human body is projected into a three dimensional scene to obtain the human body model, the human body model is adapted to the forward or backward motion of the real human body and moves forward or backward accordingly. The specific speed, mode, and the like of the motion can be determined according to a design of the human body model and a size definition of the three-dimensional scene.

It can be seen that, through the above steps, the forward or backward motion of the human body model can be associated with the forward or backward motion of the real human body, thereby achieving the forward or backward synchronous motion between the human body model and the real human body.

It can be understood that the three-dimensional scene provides a virtual three-dimensional space, and at the same time, it is required to perform image rendering to the human body model to make it more suitable for implement the presentation of the human body model.

S14: changing a position of the human body model in the three-dimensional scene according to the motion information.

The method for a synchronous motion of a human body model provided by this embodiment achieves the forward or backward synchronous motion between a human body model and a real human body by: acquiring a size change information, determining motion information according to the size change information, and changing a position of the human body model in the three-dimensional scene according to the motion information.

Figure 3:
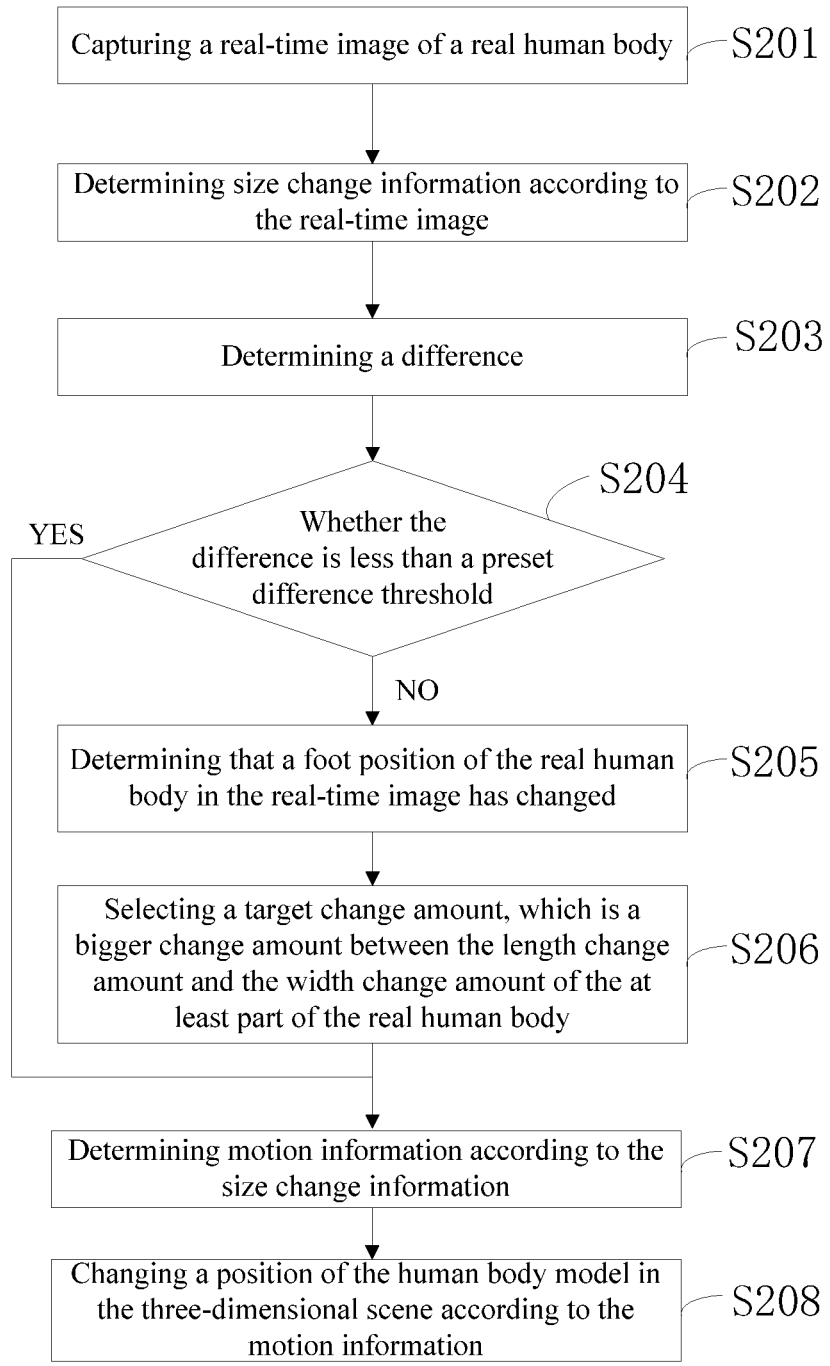
FIG. 3 is a schematic flow chart of a method for a synchronous motion of a human body model according to another embodiment of the present disclosure.
Figure 4:
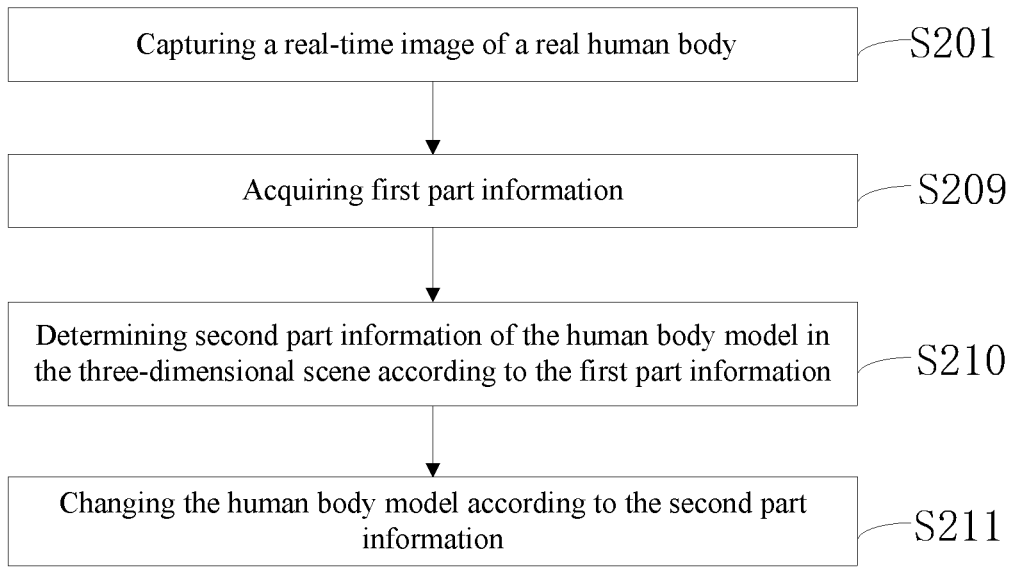
FIG. 4 is a schematic flow chart of a method for a synchronous motion of a human body model according to another embodiment of the present disclosure.

FIG. 3 is a schematic flow chart of a method for a synchronous motion of a human body model according to another embodiment of the present disclosure; FIG. 4 is a schematic flow chart of a method for a synchronous motion of a human body model according to another embodiment of the present disclosure.

Referring to FIG. 3, the method for a synchronous motion of a human body includes:

S201: capturing a real-time image of a real human body.

The technical terms, technical features, technical effects and optional implementations involved in step S201 can be understood by referring to the application scenario shown in FIG. 1 and the description of step S11 shown in FIG. 2, and similar contents will not be repeated herein.

In one implementation, there may be only one real human body in the real-time image, and there may be only one corresponding human body model as well. If there is only one real human body and one human body model, recognition of the human body and the body members, and a synchronized motion control can be conveniently and accurately realized.

In other optional implementations, there may also be multiple real human bodies, and the corresponding human body model may be one, where the human body model is synchronized with one of the multiple real human bodies; the corresponding human body model may also be multiple, where each human body model is synchronized with one real human body.

In a specific implementation, if the number of the real human body is multiple, which real human body the human body model needs to be associated with may be determined using a current position of the real human body, and which real human body the human body model needs to be associated with may also be determined using an initial position of the real human body, and which real human body the human body model needs to be associated with may also be determined using an identifier provided on the real human body. Where the association can be understood as a determination of which real human body move in sync with which human body model. By associating the real human body with the human body model, the confusion that not knowing which real human body to be associated with which human body model can be avoid when the real human body is multiple.

S202: determining size change information according to the real-time image.

The technical terms, technical features, technical effects and optional implementations involved in step S202 can be understood by referring the description of step S12 shown in FIG. 2, and similar contents will not be repeated herein.

S203: determining a difference.

It can be understood that the difference is used to represent a difference between a standard length-to-width ratio of the at least part of the real human body and a current length-to-width ratio of the at least part of the real human body in the real-time image.

Figure 5:
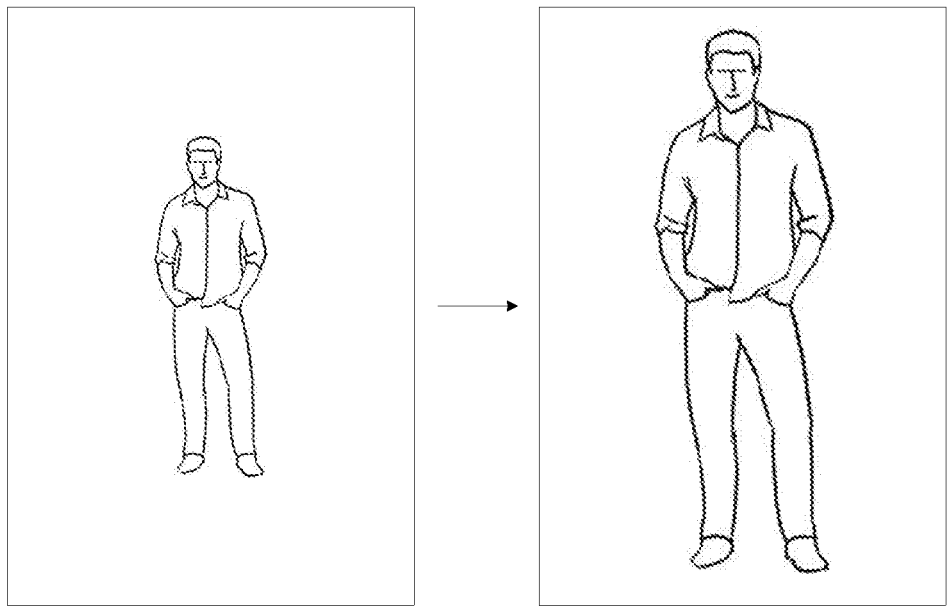
FIG. 5 is a schematic diagram of a real-time image according to an embodiment of the present disclosure.

FIG. 5 is a schematic diagram of a real-time image according to an embodiment of the present disclosure.

Where, a length-to-width ratio is, for example, a ratio between a length and a width of at least part of the real human body. And further, the length may be, for example, a distance or a height difference between the highest point and the lowest point of the at least part of the real human body in the real-time image; and the width may be, for example, a distance or a lateral width difference between the leftmost point and the rightmost point of the real human body in the real-time image.

Where a standard length-to-width ratio can be represented as:

$$r_0 = h_0/w_0;$$

Where $r_0$ represents the standard length-to-width ratio, $h_0$ represent a standard length, and $w_0$ represents a standard width.

Correspondingly, a current length-to-width ratio is represented as:

$$r_1 = h_1/w_1;$$

Where $r_1$ represents the current length-to-width ratio, $h_1$ represents a current length, and $w_1$ represents a current width.

In one implementation, the standard length-to-width ratio may be an initial length-to-width ratio of the at least part of the real human body, the standard length may be an initial length of the at least part of the real human body, and the standard width may be an initial width of the at least part of the real human body.

The at least part of the human body may be a part or all of the real human body. In one implementation, the at least part of the human body may be a torso part of the human body. Where, the torso part may generally be referred to as the body, and specifically, the part of the human body without limbs, neck, and head. In some examples, the torso part may also specifically refer to the upper body that satisfies the above description. In other examples, the torso part may satisfy a combination of the upper body and the lower body described above.

It can be understood that the difference is used to represent a difference between a standard length-to-width ratio of the at least part of the real human body and a current length-to-width ratio of the at least part of the real human body in the real-time image, based on the formula described above, in one embodiment, the difference may be $(r_1 - r_0)$.

For the at least part of the real human body, for example the torso part, when a large magnitude body change does not occur thereto, the length-to-width ratio of thereof is consistent or changes within a small change interval, so that whether a large magnitude body change occurs to the at least part of the real human body can be learned through the above step S203. Further, two cases that a large magnitude body change occurs and a large magnitude body change does not occurs may be discriminated in this embodiment so as to determine the size change and motion information more accurate.

The above large magnitude body change may be, a human body twist for example bending down, in that case, since the magnitude of the human body change is large, the size of the torso represented by a two-dimensional real-time image cannot truly reflect the forward or backward motion of the real human body. For example, in the case of bending down, the size of the torso part seen in the image is getting smaller, but it does not mean that the human body is moving forward. Thus, if such case is not discriminated, it will interfere with the determination of the size change and the motion information. Therefore, the large magnitude body change mentioned above is corresponding to a magnitude of body change than can cause interference.

S204: whether the difference is less than a preset difference threshold.

If it is less than the preset difference threshold, then the large magnitude body change mentioned above does not occur to the at least part of the real human body for example the torso part, and at this time, the size change of the torso part in the two-dimensional real-time image can represent the forward or backward motion of the real human body.

At the same time, since its length-to-width ratio does not change much, the size change of the torso part can be represented using the current length or the current width. Therefore, if the determination result of step S204 is YES, then a step S207 may be implemented: determining motion information according to the size change information. At this time, the step S207 may specifically be: determining the motion information according to a length change amount and a width change amount of the at least part of the real human body.

If the determination result of step S204 is NO, then a step S205 and a step S206 may be performed before the step S207. That is, if the difference is greater than or equal to the difference threshold, then the step S205 and the step S206 may be performed before the step S207.

S205: determining that a foot position of the real human body in the real-time image has changed in the depth direction.

As mentioned above, when a large magnitude body change occurs to the at least part of the real human body such as the torso part, since the size change does not indicate a motion, it is required to perform the step S205, so that a change of a foot position of the real human body may be used to assist in determining whether a motion has occurred.

S206: selecting a target change amount, which is a bigger change amount between the length change amount and the width change amount of the at least part of the real human body.

In that case, the step S207 specifically is: determining the motion information according to the target change amount.

In a specific implementation, if the standard length-to-width ratio is the initial length-to-width ratio, and the at least part of the real human body is the torso part, then when acquiring the real-time image of the real human body for the first time, a user may be guided to stand in a normal position with nothing covering his/her body. At this time, the length and width of the torso part are acquired, and the length-to-width ratio is calculated as a normal length-to-width ratio, that is, standard length-to-width ratio. When acquiring a following real-time image of the real human body, the current length-to-width ratio is calculated and a torso length-to-width ratio comparison is performed. If the change of the length-to-width ratio is within a normal range, that is, the difference is smaller than the difference threshold, a comparison of an absolute length of the torso may be performed, the absolute length refers to the length or width. If the absolute length is greater than the standard length, it is indicated that the real human body is moving forward, and otherwise, the human body is moving backward. At the same time, a smooth processing can also be implemented based on the above logic through a mathematical function.

Additionally, the technical terms, technical features, technical effects and optional implementations involved in step S207 can be understood by referring the description of step S13 shown in FIG. 2, and similar contents will not be repeated herein.

S208: changing a position of the human body model in the three-dimensional scene according to the motion information.

Figure 6:
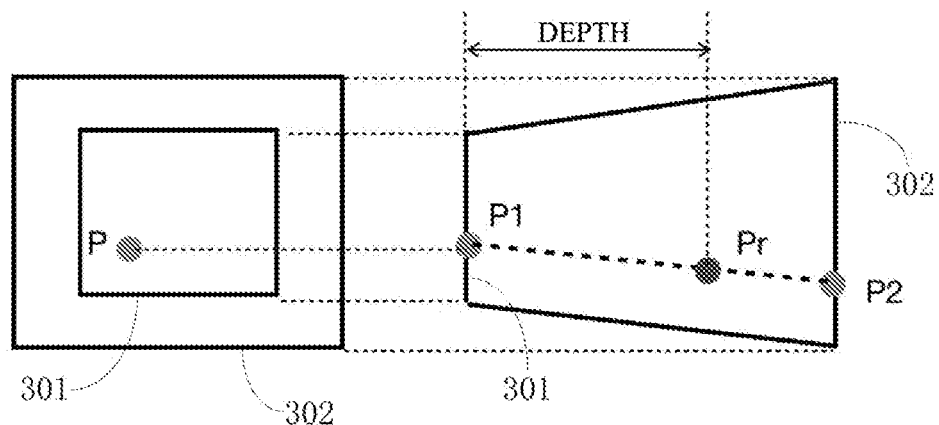
FIG. 6 is a schematic diagram illustrating a projection of a coordinate point P according to an embodiment of the present disclosure.

FIG. 6 is a schematic diagram illustrating a projection of a coordinate point P according to an embodiment of the present disclosure.

Referring to FIG. 6, the step S208 may be combined with a projection of the position, the projection of the position mainly depends on three parameters, including coordinate point positions (X, Y) and a projection depth "DEPTH" in a real-time image.

As shown in FIG. 6, a two-dimensional coordinate point P in a real-time image is first projected onto a near vision port and the far vision port, respectively, to generate two three-dimensional points P1 and P2, respectively. And then a final point position Pr may be determined according to the projection depth "DEPTH" and a depth of each of P1 and P2.

At the beginning of acquiring the real-time image, a specified initial projection depth may be set and the initial position is generated according to the projected depth. When the human body moves forward or backward, based on a previously determined coefficient value of the forward or backward motion of the human body, that is, the motion information, the projection depth may be changed on the basis of the initial projection depth by means of comprehensively calculating the projection depth and the coefficient value.

For example, when the human body moves forward, the scale of the torso is enlarged, and the coefficient value becomes larger, in the position calculating of the human model, the changed projection depth may be divided by the coefficient value to make the projection depth smaller, at this time, the human body model may be closer to the near vision port, so that the human body model moves forward and becomes larger, and vice versa. Therefore, an effect that the human body model moves forward or backward when the real human moves forward or backward can be created.

Figure 7:
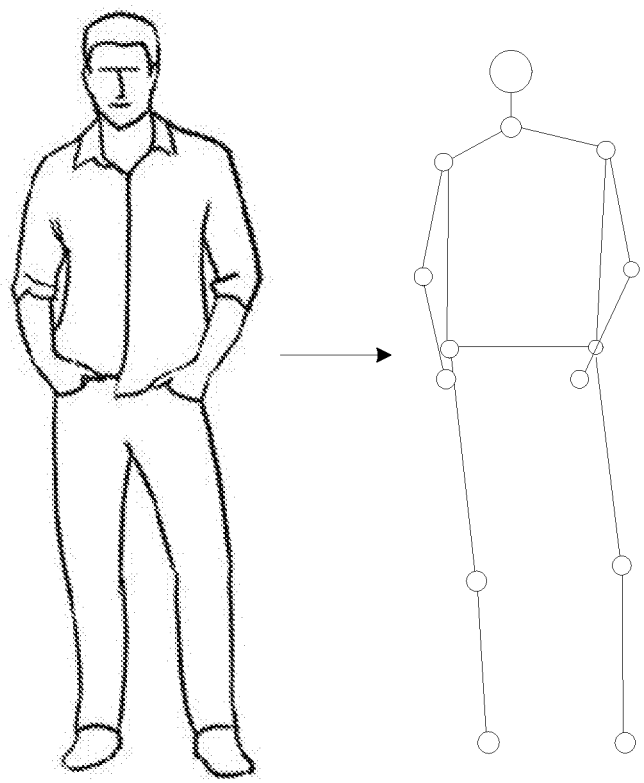
FIG. 7 is a schematic diagram of a human body model according to an embodiment of the present disclosure.

It can be seen that:

when the size change information is first size change information used to represent that the at least part of the real human body becomes bigger, the motion information is first motion information used to represent that the human body model moves toward a near field port of the three-dimensional scene;

when the size change information is second size change information used to represent that the at least part of the real human body becomes smaller, the motion information is second motion information used to represent that the human body model moves toward a far field port of the three-dimensional scene;

FIG. 7 is a schematic diagram of a human body model according to an embodiment of the present disclosure.

Referring to FIG. 4, and in conjunction with FIG. 7, after the step S201, the method further including:

S209: acquiring first part information.

It can be understood that the first part information is used to represent a position change of a human body part of the real human body in the real-time image. It may specifically including information that represents a current human body part, so that the position change can be reflected by the information of the current human body part and information of the human body part at a previous moment.

In one implementation, the first part information may include a set of coordinates of the human body part of the real human body in the real-time image, or a coordinate of a real part point of the human body part. It can be understood that the real part point is determined according to a human body part, for example, for a human head, a center point of the head may be defined as the corresponding real part point. And the real part point may also be determined based on preset confidence information.

S210: determining second part information of the human body model in the three-dimensional scene according to the first part information.

It can be understood that, the second part information is used to represent a position change of a model part point corresponding to the human body part in the human body model. It may specifically including information that represents a current position of the model part point, so that the position change can be reflected by the information of the current position of the model part point and position information of the model part point at a previous moment.

In one implementation, the second part information may include a coordinate of model part point of the human body model, and it may specifically refer to coordinates of two dimensions perpendicular to the depth direction.

Referring to FIG. 7, in one implementation, the model part points are connected by straight line units to form a human body model. In other embodiments, a model entity of the human body cannot be fully represented based on the straight units and the model part point, therefore, a model entity occupying a two-dimensional or three-dimensional space may be bound based on the model port points and/or straight line units, where the model entity may be described by a particular area or volume, as well as the corresponding shape, position, and the like. After the bounding, a human body model occupying a three dimensional space can be generated.

S211: changing the human body model according to the second part information.

Where, the step S211 can realize both a posture change of the human body model and a position change of the human body model in a direction perpendicular to the depth direction, for example, a lateral left or right motion.

In one implementation, the moving position of the human body model in the lateral direction, that is, in the left or right direction, is actually the moving position of the foot point or the leg point in the model part point of the human body model along the lateral direction, and the moving position is determined based on the position of the foot or the foot point in the real human body.

The determining of foot position may include: first it is mainly based on the real part point, such as a head point, a shoulder point, and a hip point of human body. Generally, when a person moves normally, the order of the head point, the shoulder point and the hip point should be from top to bottom, and this logic can be used to determine whether the human body is in a normal posture. When the human body is in a normal posture, the lowest point of the real human body in the image is the position of the foot point of the human body.

If a depth camera is combined, the human body model may be a three-dimensional model, thus, based on the position change described above, the motion of the model in the depth direction can also be represented. If the human body model is a two-dimensional model, that is, motions of the model part points and straight line units are motions in a two-dimensional plane that may be perpendicular to the depth direction. Whether it is a three-dimensional model or a two-dimensional model, since it may move along the depth direction, each model part point of the human body model has a three-dimensional coordinate. The difference is: if it is a three-dimensional model, a posture change and a motion in the depth direction need to be considered for the coordinate value in the depth direction of the model part point; if it is a two-dimensional model, mainly a motion of the two-dimensional model in the depth direction needs to be considered for the coordinate value in the depth direction of the model part point.

It can be seen that, whether it is a three-dimensional model capable of three-dimensional motion or a two-dimensional model capable of two-dimensional motion, the forward or backward motion of the human body model, i.e., positioning of the human body model along the depth direction, can be implemented using the above-described steps S201 to S208.

In one implementation, the human body part includes at least one of: a head, a neck, a left shoulder, a right shoulder, a left elbow, a right elbow, a left wrist, a right wrist, a left hip, a right hip, a left knee, a right knee, a left foot, and a right foot. The each human body part may have a model part point correspondingly.

One example of optional embodiments of the present disclosure may be described as following:

The real human body can be scanned by a camera of a portable computing device, and at this time, the human body will occupy a certain number of pixels on the real-time image. Through a human body point detection algorithm, the screen pixel coordinates of the human body can be separated and saved, which is the human body part involved in the foregoing.

A two-dimensional coordinate in the real-time image can be projected into a three-dimensional coordinate system corresponding to a virtual scene to obtain a position of the real human body in the virtual world. In one embodiment, the foot position of the real human body can be used as a position of a leg point or foot point of the virtualized three-dimensional model, and an initial position of human body model in the three-dimensional scene can be determined accordingly. At this time, the position of the human body model can be substantially consistent with the position of the real human body.

After the human body model is placed in an appropriate position, the human body model begins to move with the real human body. During the motion of each frame, a two-dimensional point of the human foot may be obtained through a human body point detection algorithm, and the two-dimensional coordinate is converted into a three-dimensional coordinate by projection, and the coordinate is converted as the position of the human body model.

When the real human body moves forward or backward, since the two-dimensional coordinate point cannot accurately reflect the forward or backward motion of the human body, the forward or backward motion of the human body model can be driven by the change in the proportion of the torso portion of the human body in the image.

The method for a synchronous motion of a human body model provided by this embodiment achieves the forward or backward synchronous motion between a human body model and a real human body by: acquiring a size change information, determining motion information according to the size change information, and changing a position of the human body model in the three-dimensional scene according to the motion information.

Figure 8:
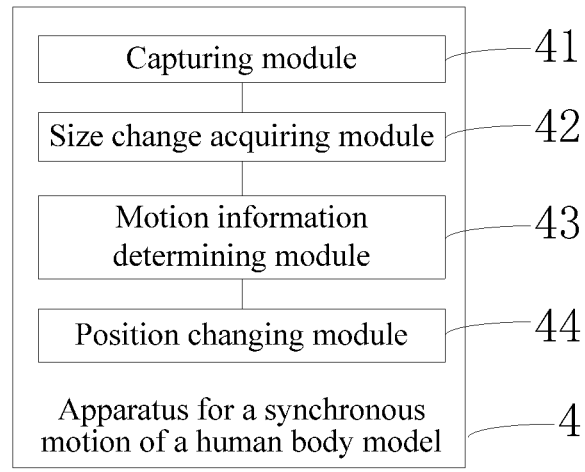
FIG. 8 is a schematic structural diagram of an apparatus for synchronous motion of a human body model according to an embodiment of the present disclosure.

FIG. 8 is a schematic structural diagram of an apparatus for synchronous motion of a human body model according to an embodiment of the present disclosure.

Referring to FIG. 8, an apparatus for a synchronous motion of a human body model 4, including:

a capturing module 41, which is configured to capture a real-time image of a real human body;

a size change acquiring module 42, which is configured to determine size change information according to the real-time image, where the size change information is used to represent a size change of at least part of the real human body in the real-time image;

a motion information determining module 43, which is configured to determine motion information according to the size change information, where the motion information is used to represent a position change of the human body model along a depth direction in a three-dimensional scene, and the human body model is used to simulate the real human body;

a position changing module 44, which is configured to change a position of the human body model in the three-dimensional scene according to the motion information.

The apparatus for a synchronous motion of a human body model provided by this embodiment achieves the forward or backward synchronous motion between a human body model and a real human body by: acquiring a size change information, determining motion information according to the size change information, and changing a position of the human body model in the three-dimensional scene according to the motion information.

Figure 9:
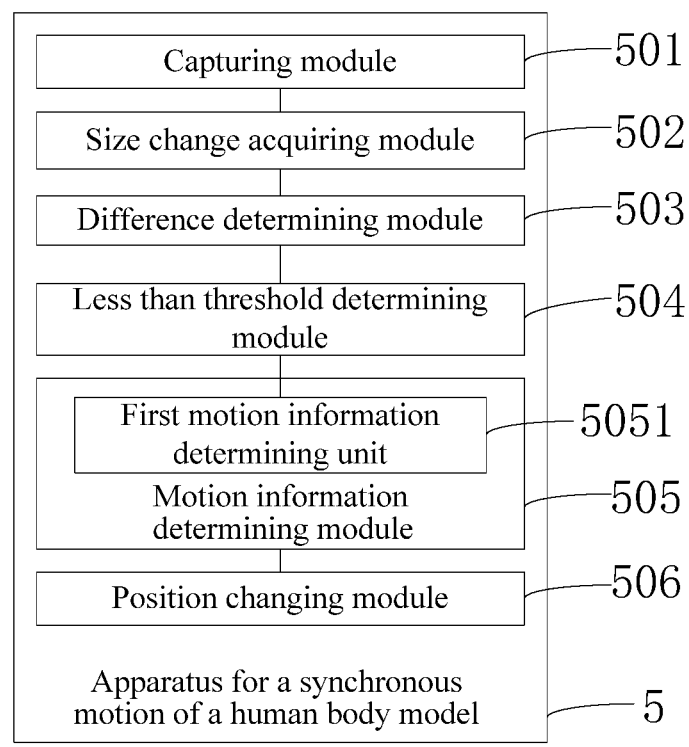
FIG. 9 is a schematic structural diagram of an apparatus for synchronous motion of a human body model according to another embodiment of the present disclosure.
Figure 10:
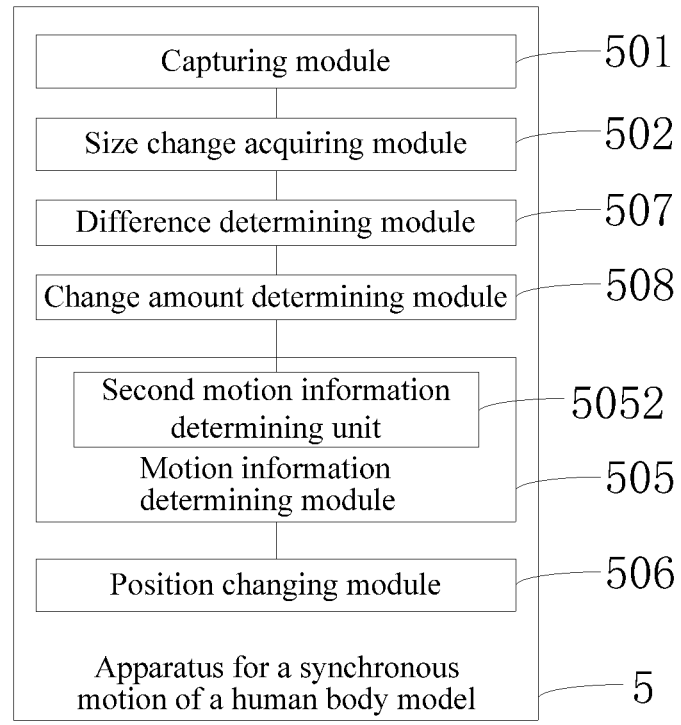
FIG. 10 is a schematic structural diagram of an apparatus for synchronous motion of a human body model according to another embodiment of the present disclosure.

FIG. 9 is a schematic structural diagram of an apparatus for synchronous motion of a human body model according to another embodiment of the present disclosure; FIG. 10 is a schematic structural diagram of an apparatus for synchronous motion of a human body model according to another embodiment of the present disclosure.

Referring to FIG. 9 and FIG. 10, an apparatus for synchronous motion of a human body model 5 including:

a capturing module 501, which is configured to capture a real-time image of a real human body;

a size change acquiring module 502, which is configured to determine size change information according to the real-time image, where the size change information is used to represent a size change of at least part of the real human body in the real-time image;

a motion information determining module 505, which is configured to determine motion information according to the size change information, where the motion information is used to represent a position change of the human body model along a depth direction in a three-dimensional scene, and the human body model is used to simulate the real human body;

a position changing module 506, which is configured to change a position of the human body model in the three-dimensional scene according to the motion information.

Optionally, Referring to FIG. 9, the apparatus further includes:

a difference determining module 503, which is configured to determine a difference, where the difference is used to represent a difference between a standard length-to-width ratio of the at least part of the real human body and a current length-to-width ratio of the at least part of the real human body in the real-time image.

a less than threshold determining module 504, which is configured to determine whether the difference is less than a preset difference threshold.

Optionally, when the difference is less than the difference threshold, the motion information determining module 505 including:

a first motion information determining unit 5051, which is configured to determine the motion information according to a length change amount and a width change amount of the at least part of the real human body.

Optionally, Referring to FIG. 10, when the difference is greater than or equal to the difference threshold, further including:

a change amount determining module 508, which is configured to select a target change amount, which is a bigger change amount between the length change amount and the width change amount of the at least part of the real human body; and the motion information determining module 505 including:

a second motion information determining unit 5052, which is configured to determine the motion information according to the target change amount.

Optionally, the apparatus further includes:

a foot motion determining module, which is configured to determine that a foot position of the real human body in the real-time image has changed in the depth direction.

Figure 11:
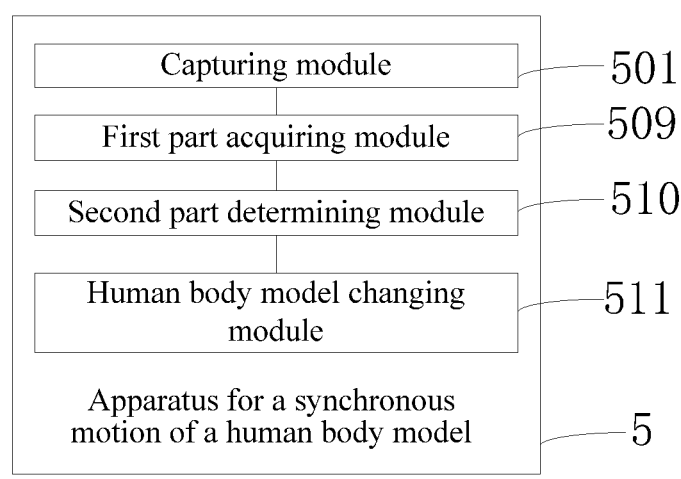
FIG. 11 is a schematic structural diagram of an apparatus for synchronous motion of a human body model according to another embodiment of the present disclosure.

Optionally, when the size change information is first size change information used to represent that the at least part of the real human body becomes bigger, the motion information is first motion information used to represent that the human body model moves toward a near field port of the three-dimensional scene;

when the size change information is second size change information used to represent that the at least part of the real human body becomes smaller, the motion information is second motion information used to represent that the human body model moves toward a far field port of the three-dimensional scene;

FIG. 11 is a schematic structural diagram of an apparatus for synchronous motion of a human body model according to another embodiment of the present disclosure.

Optionally, Referring to FIG. 11, the apparatus further includes:

a first part acquiring module 509, which is configured to acquire first part information, where the first part information is used to represent a position change of a human body part of the real human body in the real-time image;

a second part determining module 510, which is configured to determine second part information of the human body model in the three-dimensional scene according to the first part information, where the second part information is used to represent a position change of a model part point corresponding to the human body part in the human body model;

a human body model changing module 511, which is configured to change the human body model according to the second part information.

Optionally, the at least part of the real human body is a torso part of the real human body.

Optionally, the human body part includes at least one of: a head, a neck, a left shoulder, a right shoulder, a left elbow, a right elbow, a left wrist, a right wrist, a left hip, a right hip, a left knee, a right knee, a left foot, and a right foot.

The apparatus for a synchronous motion of a human body model provided by this embodiment achieves the forward or backward synchronous motion between a human body model and a real human body by: acquiring a size change information, determining motion information according to the size change information, and changing a position of the human body model in the three-dimensional scene according to the motion information.

Figure 12:
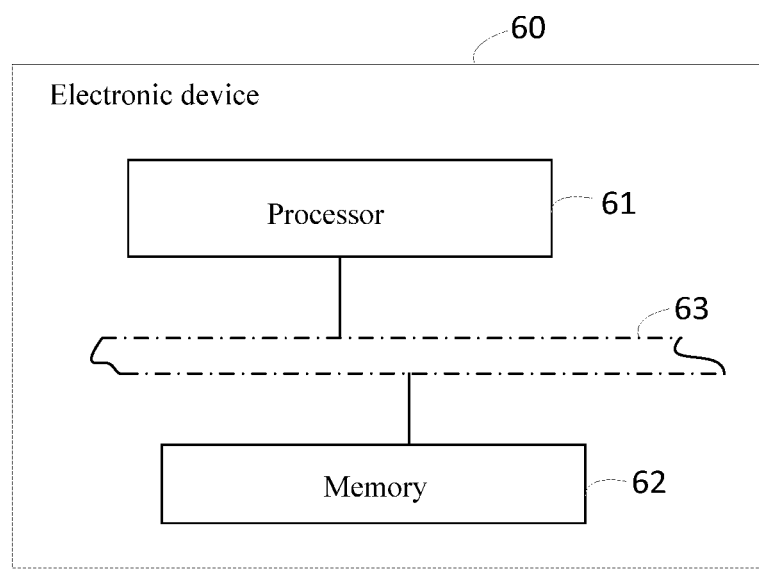
FIG. 12 is a schematic structural diagram of an electronic device of an embodiment of the present disclosure.

FIG. 12 is a schematic structural diagram of an electronic device of an embodiment of the present disclosure.

Referring to FIG. 12, the present disclosure also provides an electronic device 60, including: a processor 61 and a memory 62, where:

the memory 62 is configured to store a computer program;

the processor 61 is configured to execute an instruction stored on the memory 62 to perform the steps involved in the above methods. For details, please refer to the related description in the above method embodiments.

Optionally, the memory 62 can be either stand-alone or integrated with the processor 61.

When the memory 62 is a device separate from the processor 61, the electronic device 60 may also include:

a bus 63, which is configured to connect the memory 62 and the processor 61.

This embodiment further provides a storage medium having a computer program stored thereon, when the program is executed by at least one processor of the electronic device, the methods provided by the various embodiments described above are implemented by the electronic device.

The embodiment also provides a program product including a computer program stored in a readable storage medium. At least one processor of the electronic device can read the computer program from the readable storage medium, and the at least one processor executes the computer program such that the methods provided by the various embodiments described above are implemented by the electronic device.

One of ordinary skill in the art will appreciate that all or some of the steps of the various method embodiments described above may be realized by hardware associated with the program instructions. The above-mentioned program can be stored in a computer readable storage medium. The program, when executed, performs the steps including the above method embodiments, and the above storage medium includes various media that can store program codes, such as a ROM, a RAM, a magnetic disk, or an optical disk.

It should be noted that the above embodiments are only used to illustrate the technical solutions of the present disclosure, and the technical solutions of the present disclosure are not limited thereto. Although the present disclosure has been described in detail with reference to the foregoing embodiments, those skilled in the art should understand that the technical solutions described in the above embodiments may be modified, or some of the technical features may be equivalently substituted, and those modifications or substitutions do not deviate the nature of the corresponding technical solutions from the scope of the technical solutions of respective embodiments of the present disclosure.

What is claimed is:

1. A method for a synchronous motion of a human body model, comprising:
   capturing a real-time image of a real human body;
   determining size change information according to the real-time image, wherein the size change information is used to represent a size change of at least part of the real human body in the real-time image;
   determining motion information according to the size change information, wherein the motion information is used to represent a position change of the human body model along a depth direction in a three-dimensional scene, and the human body model is used to simulate the real human body; and
   changing a position of the human body model in the three-dimensional scene according to the motion information;
   wherein before the determining of motion information according to the size change information, the method further comprises:
   determining a difference, wherein the difference is used to represent a difference between a standard length-to-width ratio of the at least part of the real human body and a current length-to-width ratio of the at least part of the real human body in the real-time image; and
   determining whether the difference is less than a preset difference threshold.

2. The method according to claim 1, when the difference is less than the preset difference threshold, the determining of motion information according to the size change information comprising:
   determining the motion information according to a length change amount and a width change amount of the at least part of the real human body.

3. The method according to claim 1, when the difference is greater than or equal to the preset difference threshold, further comprising:
   selecting a target change amount, which is a bigger change amount between a length change amount and a width change amount of the at least part of the real human body; and
   the determining of motion information according to the size change information, comprising:
   determining the motion information according to the target change amount.

4. The method according to claim 3, before the selecting a target change amount, which is a bigger change amount between the length change amount and the width change amount of the at least part of the real human body, further comprising:
   determining that a foot position of the real human body in the real-time image has changed in the depth direction.

5. The method according to claim 1, wherein when the size change information is first size change information used to represent that the at least part of the real human body becomes bigger, the motion information is first motion information used to represent that the human body model moves toward a near field port of the three-dimensional scene; and
   when the size change information is second size change information used to represent that the at least part of the real human body becomes smaller, the motion information is second motion information used to represent that the human body model moves toward a far field port of the three-dimensional scene.

6. The method according to claim 1, after the capturing a real-time image of a real human body, further comprising:
   acquiring first part information, wherein the first part information is used to represent a position change of a human body part of the real human body in the real-time image;
   determining second part information of the human body model in the three-dimensional scene according to the first part information, wherein the second part information is used to represent a position change of a model part point corresponding to the human body part in the human body model; and
   changing the human body model according to the second part information.

7. The method according to claim 6, wherein the human body part includes at least one of: a head, a neck, a left shoulder, a right shoulder, a left elbow, a right elbow, a left wrist, a right wrist, a left hip, a right hip, a left knee, a right knee, a left foot, and a right foot.

8. The method according to claim 1, wherein the at least part of the real human body is a torso part of the real human body.

9. An apparatus for a synchronous motion of a human body model, comprising: a processor and a computer-readable medium for storing program codes, which, when executed by the processor, cause the processor to:

capture a real-time image of a real human body;

determine size change information according to the real-time image, wherein the size change information is used to represent a size change of at least part of the real human body in the real-time image;

determine motion information according to the size change information, wherein the motion information is used to represent a position change of the human body model along a depth direction in a three-dimensional scene, and the human body model is used to simulate the real human body; and change a position of the human body model in the three-dimensional scene according to the motion information;

wherein the program codes further cause the processor to:

determine a difference, wherein the difference is used to represent a difference between a standard length-to-width ratio of the at least part of the real human body and a current length-to-width ratio of the at least part of the real human body in the real-time image; and determine whether the difference is less than a preset difference threshold.

10. The apparatus according to claim 9, wherein, when the difference is less than the preset difference threshold, the program codes further cause the processor to:

determine the motion information according to a length change amount and a width change amount of the at least part of the real human body.

11. The apparatus according to claim 9, wherein, when the difference is greater than or equal to the preset difference threshold, the program codes further cause the processor to:

select a target change amount, which is a bigger change amount between a length change amount and a width change amount of the at least part of the real human body; and determine the motion information according to the target change amount.

12. The apparatus according to claim 11, wherein, the program codes further cause the processor to:

determine that a foot position of the real human body in the real-time image has changed in the depth direction.

13. The apparatus according to claim 9, wherein when the size change information is first size change information used to represent that the at least part of the real human body becomes bigger, the motion information is first motion information used to represent that the human body model moves toward a near field port of the three-dimensional scene; and when the size change information is second size change information used to represent that the at least part of the real human body becomes smaller, the motion information is second motion information used to represent that the human body model moves toward a far field port of the three-dimensional scene.

14. The apparatus according to claim 9, wherein the program codes further cause the processor to:

acquire first part information, wherein the first part information is used to represent a position change of a human body part of the real human body in the real-time image;

determine second part information of the human body model in the three-dimensional scene according to the first part information, wherein the second part information is used to represent a position change of a model part point corresponding to the human body part in the human body model; and change the human body model according to the second part information.

15. The apparatus according to claim 14, wherein the at least part of the real human body is a torso part of the real human body.

16. The apparatus according to claim 9, wherein the human body part includes at least one of: a head, a neck, a left shoulder, a right shoulder, a left elbow, a right elbow, a left wrist, a right wrist, a left hip, a right hip, a left knee, a right knee, a left foot, and a right foot.

17. The method for a synchronous motion of a human body model according to claim 1, further comprising:

executing an executable instruction on a memory and a processor, wherein the memory is configured to store the executable instruction of the processor, the processor is configured to perform.

18. A non-transitory computer-readable storage medium, having a computer program stored thereon, wherein the program is executed by a processor so as to implement the method for a synchronous motion of a human body model according to claim 1.

* * * * *